United States Patent
Kojima (10) Patent No.: US 10,656,003 B2
(45) Date of Patent: May 19, 2020

(54) LIQUID SURFACE SENSOR AND LIQUID SURFACE DETECTION METHOD

(71) Applicant: Seiko Epson Corporation, Tokyo (JP)

(72) Inventor: Chikara Kojima, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/203,908

(22) Filed: Nov. 29, 2018

(65) Prior Publication Data
US 2019/0162577 A1  May 30, 2019

(30) Foreign Application Priority Data
Nov. 30, 2017 (JP) ................. 2017-230037

(51) Int. Cl.
*G01F 23/296* (2006.01)
*G01F 23/00* (2006.01)
*B41J 2/175* (2006.01)

(52) U.S. Cl.
CPC ...... *G01F 23/2966* (2013.01); *B41J 2/17566* (2013.01); *G01F 23/0061* (2013.01); *G01F 23/2962* (2013.01); *G01F 23/2968* (2013.01); *B41J 2002/17583* (2013.01)

(58) Field of Classification Search
CPC ............ G01F 23/2966; G01F 23/2962; G01F 23/2968
See application file for complete search history.

(56) References Cited

U.S. PATENT DOCUMENTS

| | | | |
|---|---|---|---|
| 2002/0167414 A1* | 11/2002 | Kelly | ................. G01F 23/2967 340/621 |
| 2006/0007259 A1 | 1/2006 | Zhang | |
| 2010/0187953 A1* | 7/2010 | Ohnishi | ............. H01L 41/0973 310/365 |
| 2015/0013452 A1* | 1/2015 | Bostrom | ............... G01F 23/296 73/290 V |

FOREIGN PATENT DOCUMENTS

| | | |
|---|---|---|
| JP | 2006-029918 A | 2/2006 |
| JP | 2009-293967 A | 12/2009 |
| JP | 2012-122784 A | 6/2012 |

* cited by examiner

*Primary Examiner* — Paul M. West
(74) *Attorney, Agent, or Firm* — Harness, Dickey & Pierce, P.L.C.

(57) ABSTRACT

A liquid surface sensor includes a hollow member having a first opening end and a second opening end, and a sensor unit provided so as to close the first opening end of the hollow member. The sensor unit includes a vibration plate, and a piezoelectric element which is provided on the vibration plate and is formed by laminating a first electrode film, a piezoelectric film, and a second electrode film in a thickness direction of the vibration plate.

3 Claims, 7 Drawing Sheets

LIQUID SURFACE SENSOR AND LIQUID SURFACE DETECTION METHOD

BACKGROUND

1. Technical Field

The present invention relates to a liquid surface sensor and a liquid surface detection method.

2. Related Art

In the related art, a liquid surface sensor that detects a liquid surface of a liquid stored in a tank has been known (for example, see JP-A-2012-122784).

The liquid surface sensor described in JP-A-2012-122784 is provided with a buzzer on a sidewall surface within the tank and causes the buzzer to output a buzzer sound having a predetermined frequency. The liquid surface sensor detects the amount of liquid within the tank based on a change in sound pressure of sound produced from an entrance of the tank, which is determined by a Helmholtz resonant frequency changed based on a volume of a gas within the tank and a frequency of the buzzer sound within a range in which the Helmholtz resonant frequency is changed.

Incidentally, as described in JP-A-2012-122784, in the sensor that detects the liquid surface using the Helmholtz resonant frequency, acoustic matching between a resonant element (for example, buzzer) and a resonance target (for example, air within the tank) is bad, and thus, it is difficult to improve measurement precision of the liquid surface within the tank.

In the liquid surface sensor using the Helmholtz resonant frequency, since it is necessary to provide the buzzer on a side surface within the tank and it is necessary to form a sufficient space for storing the air as the resonance target, it is necessary to form a large measurement space, and thus, a measurement environment is restricted like a case where it is difficult to measure a narrow space.

SUMMARY

An advantage of some aspects of the invention is to provide a liquid surface sensor and a liquid surface detection method capable of measuring a position of a liquid surface with high precision irrespective of a measurement environment.

A liquid surface sensor according to an application example includes a hollow member that has a first opening end and a second opening end, and a sensor unit that is provided so as to close the first opening end of the hollow member. The sensor unit includes a vibration plate, and a piezoelectric element that is provided on the vibration plate and is formed by laminating a first electrode film, a piezoelectric film, and a second electrode film in order in a thickness direction of the vibration plate.

In the liquid surface sensor according to the application example, when the liquid surface sensor is disposed with respect to the liquid such that the second opening end of the hollow member enters the liquid, a space (hollow space) from the liquid surface of the hollow member to the sensor unit is a substantially closed space. In the liquid surface sensor having such a configuration, the vibration plate vibrates in the natural frequency determined by the inertia of the gas of the hollow space and the rigidity of the vibration plate, and thus, it is possible to calculate the distance from the sensor unit to the liquid surface based on the resonant frequency. Accordingly, it is not necessary to form a wide space for causing Helmholtz resonance within a tank that stores the liquid unlike the related art, and thus, it is possible to detect a liquid surface position irrespective of the measurement environment.

Incidentally, when the distance is calculated based on the natural frequency determined by the inertia of the gas of the hollow space and the rigidity of the vibration plate, the precision depends on inertance (a ratio of the input stress to the acceleration caused due to the stress) of the sensor unit and the inertance of the gas from the sensor unit to the liquid surface. When a density of the sensor unit is $\rho_{act}$, a thickness dimension is t, and a sectional area perpendicular to the thickness direction is S, inertance $M_{act}$ of the sensor unit satisfies the relationship of $M_{act} \propto (\rho_{act} \times t)/S$. Meanwhile, when a density of the gas is $\rho_{gas}$ and the distance from the sensor unit to the liquid surface is l, inertance $M_{gas}$ of the gas of the hollow space satisfies the relationship of $M_{gas} = (\rho_{gas} \times l)/S$.

In a case where the vibration plate resonates, when a compliance of the sensor unit is $C_{act}$ and a compliance of the gas of the hollow space is $C_{gas}$, a resonant frequency f thereof satisfies the relationship of $f = 1/\{(M_{act}+M_{gas})(C_{act}+C_{gas})\}^{1/2}$.

As stated above, when the distance from the sensor unit to the liquid surface is calculated based on the resonant frequency, the precision is greatly influenced by whether $M_{gas}$ including the term of the distance l is larger or smaller than $(M_{act}+M_{gas})$. That is, when a value of $M_{act}$ is larger than that of $M_{gas}$, $M_{gas}$ is detected as noise, and thus, the measurement precision extremely becomes bad. Meanwhile, when $M_{act}$ and $M_{gas}$ are equal to each other or when the value of $M_{act}$ is smaller than that of $M_{gas}$, high-precision measurement can be performed.

Here, in a general bulk type piezoelectric body, the thickness dimension t increases, and the value of the inertance $M_{act}$ of the sensor unit is extremely larger than that of the inertance $M_{gas}$ of the gas. Thus, it is not possible to perform high-precision measurement. In contrast, in the application example, the piezoelectric element is constituted by a lamination body of the first electrode film, the piezoelectric film, and the second electrode film, and has a thin film shape. The total thickness dimension of the vibration plate and the piezoelectric element has a sufficiently smaller value (for example, about 1/1000 times) than that of the bulk type piezoelectric body. Accordingly, the inertance $M_{act}$ of the sensor unit can also be sufficiently small, and can be equal to or smaller than the inertance $M_{gas}$ of the gas. Thus, in the application example, it is possible to detect the liquid surface position with high precision by the liquid surface sensor.

As described, the liquid surface sensor according to the application example can measure the position of the liquid surface with high precision irrespective of the measurement environment.

In the liquid surface sensor according to the application example, it is preferable that a total film thickness of the vibration plate and the piezoelectric element is equal to or lower than 5 µm.

In the application example with this configuration, the total thickness (total thickness dimension) of the vibration plate and the piezoelectric element is equal to or lower than 5 µm. In such a case, acoustic impedance of the vibration plate and the piezoelectric element can approximate acoustic impedance of the gas of the hollow space, and a sensor output signal can increase. It is possible to sufficiently reduce the inertance $M_{act}$ of the sensor unit, and it is possible to detect the high-precision liquid surface position.

It is preferable that the liquid surface sensor according to the application example further includes a control unit that detects a position of a liquid surface when the second opening end of the hollow member is inserted in a liquid and the liquid surface is positioned in a predetermined position within the hollow member, and the control unit detects the position of the liquid surface based on a resonant frequency when the vibration plate vibrates in the natural frequency corresponding to a distance between the liquid surface and the sensor unit.

In the application example with this configuration, when the vibration plate resonates, the detection signal corresponding to the resonant frequency is output from the piezoelectric element. Thus, the control unit can detect the resonant frequency from the detection signal. When the resonant frequency is detected, it is possible to calculate the distance l from the sensor unit to the liquid surface based on the expression of $f \propto 1/\{(M_{act}+M_{gas}) (C_{act}+C_{gas})\}^{1/2}$, and it is possible to detect the liquid surface position.

In the liquid surface sensor according to the application example, it is preferable that the control unit transmits an acoustic wave to an inside of the hollow member from the sensor unit and detects the position of the liquid surface based on the resonant frequency of the vibration plate which resonates by an acoustic wave which resonates between the sensor unit and the liquid surface.

In the application example with this configuration, the control unit controls the sensor unit to apply a periodic drive voltage to the piezoelectric element, vibrates the vibration plate, and outputs the acoustic wave to the hollow space. At this time, when the natural frequency of the hollow space is included in the frequency of the output acoustic wave, the vibration plate resonates. Accordingly, it is possible to calculate the distance from the sensor unit to the liquid surface by detecting the resonant frequency from the vibration of the vibration plate as described above.

In the liquid surface sensor according to the application example, it is preferable that the control unit changes a frequency of the acoustic wave to be transmitted from the sensor unit within a predetermined frequency range, and detects the position of the liquid surface using the frequency of the acoustic wave when a signal to be output from the piezoelectric element is maximum as the resonant frequency.

In the application example with this configuration, the frequency of the acoustic wave to be output from the sensor unit is changed (frequency sweep) within a predetermined frequency range. For example, the frequency range can be set so as to correspond to the detected position of the liquid surface, and can be a range from the resonant frequency corresponding to the distance when the liquid surface is positioned at the second opening end to the resonant frequency corresponding to the distance when the liquid surface is positioned at the first opening end.

In the application example with this configuration, the frequency in which the detection signal is maximum is detected as the resonant frequency by performing the frequency sweep of the acoustic wave to be output within the frequency range, and thus, it is possible to easily detect the resonant frequency. That is, when the frequency of the acoustic wave to be output matches the resonant frequency, since the acoustic wave resonates in the hollow space and the vibration plate resonates, a vibration amplitude of the vibration plate is also maximum. Accordingly, a voltage value of the detection signal to be output from the piezoelectric element is also maximum, and thus, it is possible to detect the resonant frequency.

In the liquid surface sensor according to the application example, it is preferable that the control unit detects the position of the liquid surface by moving the vibration plate to a standby position by applying stress for displacing the vibration plate in the thickness direction and detecting the resonant frequency from vibration of the vibration plate when the application of the stress to the vibration plate is canceled from the standby position.

In the application example with this configuration, the vibration plate is moved to the standby position by applying the stress for displacing the vibration plate in the thickness direction, for example, by applying a predetermined voltage to the piezoelectric element. When the stress is canceled, the vibration plate is displaced due to damped vibration caused by restoration force. Since the damped vibration at this time is vibration in the natural frequency of the hollow space, it is possible to detect the resonant frequency by detecting the vibration frequency of the vibration plate thereof.

In the liquid surface sensor according to the application example, it is preferable that the control unit detects the position of the liquid surface from the sensor unit based on a time from a transmission timing of the acoustic wave to a reception timing thereof when the acoustic wave is transmitted from the sensor unit and the acoustic wave reflected from the liquid surface is received by the sensor unit.

In the application example with this configuration, the acoustic wave is transmitted from the sensor unit, and the position of the liquid surface is detected from the sensor unit (the distance to the liquid surface from the sensor unit) using a TOF method by using the time from the transmission timing to the reception timing and a speed of sound. In such a TOF method, when the liquid surface is at rest, it is possible to calculate the distance with high precision. It is possible to correct various parameters when the distance calculated based on the resonant frequency is calculated using the distance calculated using the TOF method.

A liquid surface detection method according to another application example of the invention is a liquid surface detection method of detecting a position of a liquid surface using a liquid surface sensor that includes a hollow member having a first opening end and a second opening end, and a sensor unit that is provided so as to close the first opening end of the hollow member. The sensor unit includes a vibration plate, and a piezoelectric element which is provided on the vibration plate and is formed by laminating a first electrode film, a piezoelectric film, and a second electrode film in order in a thickness direction of the vibration plate. The method includes causing the liquid surface sensor to be disposed such that the second opening end of the hollow member is inserted into a liquid and the liquid surface is positioned in a predetermined position within the hollow member, and causing the liquid surface sensor to detect the position of the liquid surface based on a resonant frequency when the vibration plate vibrates in the resonant frequency corresponding to a distance between the liquid surface and the sensor unit.

In the application example, similarly to the aforementioned invention, it is possible to detect the position of the liquid surface with high precision from the sensor unit using the expression of $f \propto 1/\{(M_{act}+M_{gas}) (C_{act}+C_{gas})\}^{1/2}$ based on the detected resonant frequency (the vibration frequency of the vibration plate).

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment will be described.

Configuration of Liquid Surface Sensor 1

Figure 1:
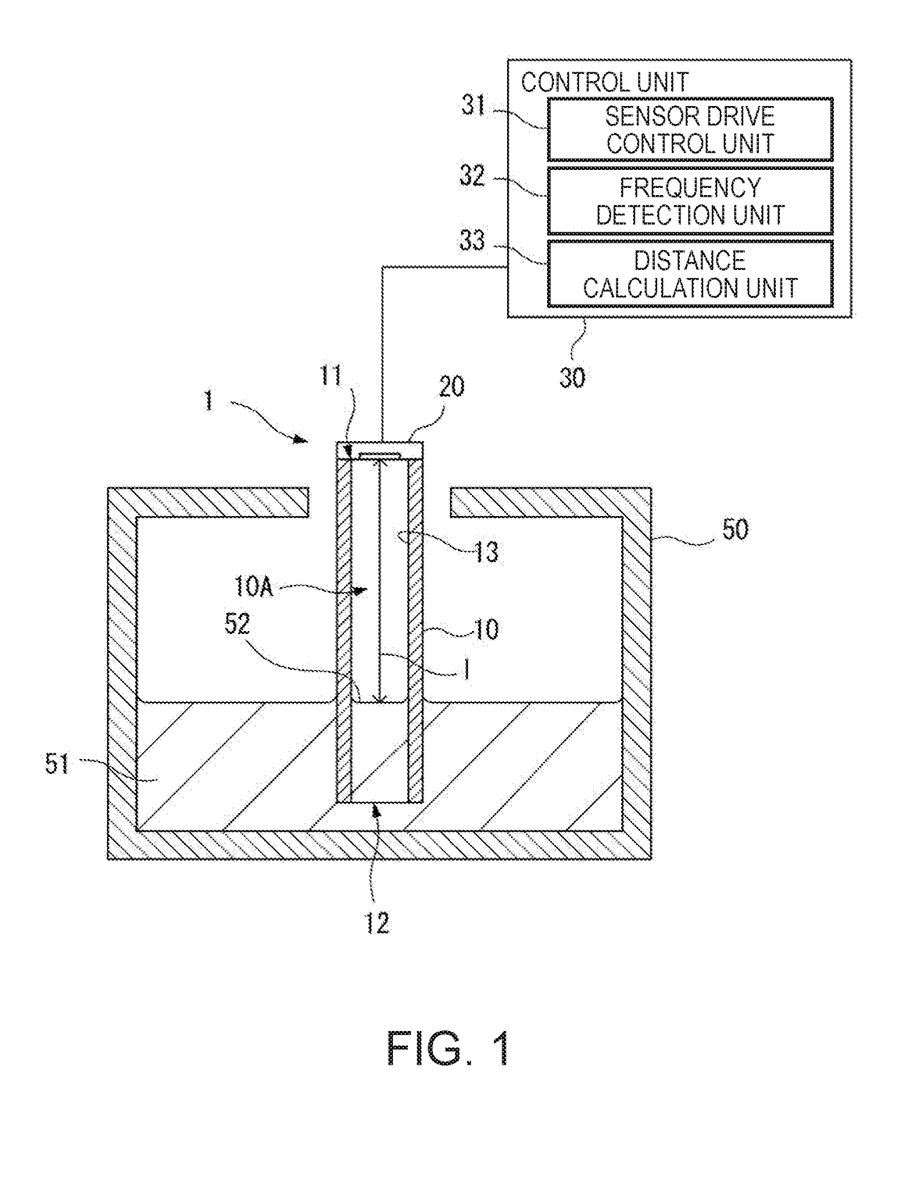
FIG. 1 is a schematic diagram showing an outline of a liquid surface sensor according to a first embodiment.

FIG. 1 is a schematic diagram showing an outline of a liquid surface sensor 1 according to a first embodiment.

As shown in FIG. 1, the liquid surface sensor 1 is provided in, for example, a tank 50 that stores a liquid 51, and includes a hollow member 10, a sensor unit 20, and a control unit 30.

Configuration of Hollow Member 10

The hollow member 10 is a substantially rod-shaped member. A first opening end 11 is formed at one end, and a second opening end 12 is formed at the other end. A portion from the first opening end 11 to the second opening end 12 is surrounded by a wall surface 13, and thus, a hollow space (tubular space) is formed. A sectional shape of the hollow member 10 may be circular or may be rectangular.

The sensor unit 20 is provided at the first opening end 11 of the hollow member 10, and thus, the first opening end 11 is closed.

The second opening end 12 of the hollow member 10 is a portion inserted into the liquid 51 when the liquid surface sensor 1 is provided within the tank 50.

Although not shown, a gas connection hole is formed near the first opening end 11 of the hollow member 10, and thus, the inside (A hollow space 10A) of the hollow member 10 and an external space are communicatively connected. Accordingly, when the second opening end 12 of the hollow member 10 is inserted into the liquid 51 of the tank 50, the liquid 51 penetrates into the hollow member 10, and a position of a liquid surface 52 in the hollow space 10A and a liquid surface position of the tank 50 have the same height.

Configuration of Sensor Unit 20

As stated above, the sensor unit 20 is provided so as to close the first opening end 11 of the hollow member 10.

Figure 2:
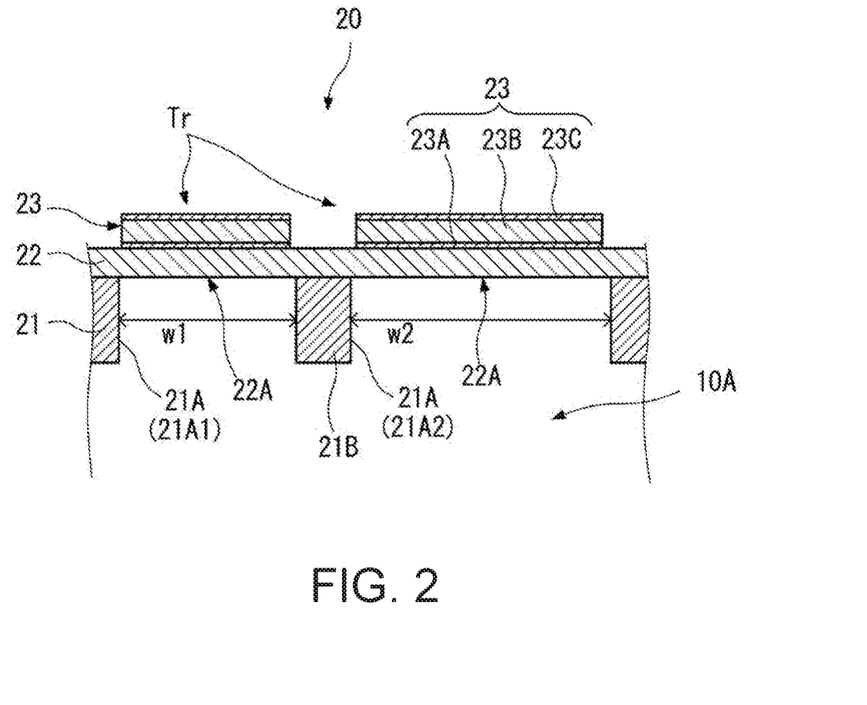
FIG. 2 is a sectional view showing an outline of a sectional shape of a part of a sensor unit according to the first embodiment.

FIG. 2 is a sectional view showing an outline of a sectional shape of a part of the sensor unit 20.

As shown in FIG. 2, the sensor unit 20 includes an element substrate 21 in which a plurality of openings 21A is formed, a vibration plate 22 that is provided on the element substrate 21 to close the openings 21A, and piezoelectric elements 23 that are provided on the vibration plate 22 and are disposed in positions so as to overlap with the openings 21A when viewed in a thickness direction of the vibration plate 22.

For example, the element substrate 21 is constituted by a semiconductor substrate such as Si. As stated above, the plurality of openings 21A is formed in the element substrate 21. In the present embodiment, each opening 21A is a through-hole that penetrates in a substrate thickness direction of the element substrate 21, and the vibration plate 22 is provided at one-side ends (in the present embodiment, a side opposite to the hollow member 10) of the through-holes.

These openings 21A include multiple kinds of openings 21A having different opening width dimensions. Although it has been described in the example shown in FIG. 2 that a first opening 21A1 of which the opening width dimension is a first dimension w1 and a plurality of second openings 21A2 of which the opening width dimension is a second dimension w2, a larger number of openings 21A having different opening dimensions are formed. The same kind of openings 21A may be formed in plural. For example, a plurality of first openings 21A1 and a plurality of second openings 21A2 may be formed.

For example, the vibration plate 22 is constituted by a laminated body made of $SiO_2$ and $ZrO_2$, and is formed to cover one end of the element substrate 21. That is, the vibration plate 22 is supported by a partition wall 21B constituting each opening 21A, and closes the opening 21A.

The piezoelectric elements 23 are provided in portions (vibration portions 22A) of the vibration plate 22, which overlap with the openings 21A when viewed in the thickness direction. The piezoelectric element 23 is constituted by a laminated body obtained by laminating a first electrode film 23A, a piezoelectric film 23B, and a second electrode film 23C in order from the vibration portion 22A.

In the sensor unit 20 having such a configuration, one acoustic transducer Tr is constituted by one vibration portion 22A and the piezoelectric element 23 on the vibration portion 22A. A thickness dimension (a dimension in the thickness direction of the vibration plate 22) of the acoustic transducer Tr, that is, a total thickness dimension of the vibration plate 22 and the piezoelectric element 23 is equal to or less than 5 µm.

In such an acoustic transducer Tr, the vibration portion 22A vibrates with the piezoelectric film 23B interposed therebetween by applying a sine wave voltage or a rectangular wave voltage (drive signal) having a predetermined frequency between the first electrode film 23A and the second electrode film 23C, and thus, an acoustic wave (including an ultrasonic wave) is transmitted toward the hollow space 10A from the opening 21A.

Resonance occurs when a natural frequency of the hollow space 10A and a frequency of the transmitted acoustic wave match each other. The vibration plate 22 (vibration portions 22A) resonates, and a vibration amplitude is amplified. Accordingly, a detection signal corresponding to the vibration amplitude is output with a waveform corresponding to a vibration frequency (resonant frequency) from the piezoelectric element 23 on the vibration portion 22A.

Here, the frequency of the acoustic wave to be transmitted from the acoustic transducer Tr is changed depending on an opening dimension of the opening 21A. Accordingly, in the present embodiment, the piezoelectric element 23 that applies the drive signal is switched in the sensor unit 20, and thus, it is possible to output acoustic waves having a plurality of frequencies while switching between the acoustic waves in order.

Incidentally, in the present embodiment, the frequency sweep of the acoustic wave to be output to the hollow space 10A is performed, and thus, the frequency of the acoustic wave matching the natural frequency of the gas of the hollow space 10A, that is, the resonant frequency at which the vibration plate 22 resonates is searched. Accordingly, it is preferable that the frequency of the acoustic wave to be transmitted from the sensor unit 20 is set based on the position of the liquid surface 52 as a detecting target. For example, when the liquid surface 52 as the detecting target is positioned in a range in which a distance from the sensor unit 20 to the liquid surface from ×1 to ×2, it is assumed that a frequency from the natural frequency of the hollow space 10A when the liquid surface 52 is positioned in distance ×1 from the sensor unit 20 to the natural frequency of the hollow space 10A when the liquid surface 52 is positioned in distance ×2 from the sensor unit 20 falls within a frequency range (hereinafter, referred to as a target frequency range) as a detecting target. The opening dimension of each opening 21A may be determined such that the frequency sweep is performed within the target frequency range.

Configuration of Control Unit 30

The control unit 30 is connected to the sensor unit 20 to control an operation of the sensor unit 20, and detects the position of the liquid surface 52 based on the detection signal output from the sensor unit 20.

For example, the control unit 30 includes an arithmetic logic unit such as a central processing unit (CPU) or a storage unit constituted by a memory. The arithmetic logic unit reads a program stored in the storage unit and executes the read program, and thus, the control unit functions as a sensor drive control unit 31, a frequency detection unit 32, and a distance calculation unit 33 as shown in FIG. 1.

The sensor drive control unit 31 vibrates the vibration portion 22A by applying a frequency drive voltage to each acoustic transducer Tr of the sensor unit 20, and outputs the acoustic wave to the hollow space 10A. The sensor drive control unit 31 sweeps the frequency of the acoustic wave to be output to the hollow space 10A by driving the acoustic transducers Tr of which the output frequencies of the acoustic waves are different in order.

The frequency detection unit 32 detects the resonant frequency when the vibration plate 22 (each vibration portion 22A) resonates. In the present embodiment, the frequency sweep of the acoustic wave to be output into the hollow space 10A is performed within the target frequency range by the sensor drive control unit 31. For example, the frequency output when the vibration plate 22 resonates is detected as the resonant frequency.

The distance calculation unit 33 calculates the distance from the sensor unit 20 to the position of the liquid surface 52 of the hollow space 10A based on the detected resonant frequency.

Calculation Principle of Distance Using Distance Calculation Unit 33

Next, a calculation principle when the distance from the sensor unit 20 to the position of the liquid surface 52 is calculated by the distance calculation unit 33 based on the resonant frequency will be described.

In the following description, it is assumed that the thickness dimension of the sensor unit 20, that is, the total thickness dimension of the vibration plate 22 and the piezoelectric element 23 is t. It is assumed that the opening 21A of the acoustic transducer Tr is formed in a rectangular shape in plan view, a dimension in a long-axis direction is L, and a dimension in a short-axis direction is w. It is assumed that Young's modulus of the acoustic transducer Tr is E, Poisson's ratio is v, a density of the vibration plate 22 is $\rho_{film}$, a density of the gas (for example, air) of the hollow space 10A is $\rho_{gas}$, and the distance from the sensor unit 20 to the liquid surface 52 is l. The distance l mentioned herein is an average distance from the vibration plate 22 to the liquid surface 52 when the vibration plate 22 resonates. That is, when the vibration portion 22A vibrates, a displacement amount becomes large at a center of the vibration portion 22A, and a displacement amount becomes smaller in an outer periphery. Here, it is assumed that a position displaced toward the liquid surface 52 from an initial position in which the vibration portion 22A by an average displacement amount does not vibrate is a reference position and a distance between the reference position and the liquid surface 52 is l.

The hollow space 10A is a substantially closed space surrounded by the wall surface 13 of the hollow member 10, the sensor unit 20, and the liquid surface 52, and the gas within the closed space functions as a sinker with inertia when the distance l from the sensor unit 20 to the liquid surface 52 is short for a wavelength of the acoustic wave. In this case, the gas within the hollow space 10A has the natural frequency determined by the inertia of the sinker and the rigidity of the vibration plate 22. As stated above, the resonant occurs when the natural frequency of the hollow space 10A and the frequency of the acoustic wave match each other, and the vibration plate 22 performs resonant vibration. When the resonant frequency at this time is f (=ω/2π), the resonant frequency f is expressed by the following Expression (1).

$$f \propto \frac{1}{\sqrt{(M_{act} + M_{gas})(C_{act} + C_{gas})}} \quad (1)$$

Here, compliance $C_{act}$ is compliance of the sensor unit 20, and is a reciprocal of the hardness of the sensor unit 20. The compliance $C_{gas}$ is compliance of the gas of the hollow space 10A from the sensor unit 20 to the liquid surface 52.

Inertance $M_{act}$ is a transfer function of the vibration in the sensor unit 20, and is inertance indicating a ratio of stress to be exerted to acceleration caused by the stress. The inertance $M_{gas}$ is inertance of the gas of the hollow space 10A from the sensor unit 20 to the liquid surface 52.

The compliance $C_{act}$ and the inertance $M_{act}$ related to the sensor unit 20 are expressed by the following Expressions (2) and (3).

$$C_{act} \propto \frac{1-v^2}{60E} \times \frac{L \times w^5}{t^3} \quad (2)$$

$$M_{act} \propto \frac{\rho_{film} \times t}{w \times L} \quad (3)$$

Incidentally, in order for the gas of the hollow space 10A to function as the sinker, the gas needs to integrally move at the distance l from the sensor unit 20 of the hollow space 10A to the liquid surface 52. That is, when the relationship between a wavelength λ of the acoustic wave and the distance l satisfies the relationship of λ>l, the gas within the hollow space 10A performs rigid motion, and exhibits only the function of the sinker. Meanwhile, when λ≤l, the gas of the hollow space 10A performs elastic motion, and has a function of a spring. That is, when λ>l, the relationship of $C_{act} \gg C_{gas}$ is satisfied.

In this case, $C_{act}+C_{gas}$ in denominator of Expression (1) may approximate $C_{act}+C_{gas} \approx C_{act}$.

Thus, the frequency of the acoustic wave to be output from each acoustic transducer Tr of the sensor unit 20 is preferably set to a frequency that satisfies the relationship of λ>l. Thus, for example, when the liquid surface 52 as the detecting target is positioned in the range in which the distance from the sensor unit 20 to the liquid surface is from ×1 to ×2, it is preferable that the acoustic wave having the frequency included in the target frequency range is output and the opening dimension of each opening 21A is formed such that the relationship of λ>×2>×1 is satisfied.

Meanwhile, the inertance $M_{gas}$ related to the gas of the hollow space 10A is expressed by the following Expression (4).

$$M_{air} = \frac{\rho_{air} \times l}{w \times L} \qquad (4)$$

In Expression (1), a parameter including the distance l is the term of $M_{gas}$. Here, when the distance l is calculated from the resonant frequency f, the calculation precision of the distance l is greatly changed by the value of $M_{act}$ with respect to $M_{gas}$.

That is, when the relationship of $M_{gas} \ll M_{act}$ is satisfied, a change amount of $M_{act}+M_{act}$ is minute with respect to the change of $M_{gas}$, and the change of $M_{gas}$ is deemed as a noise component. In contrast, when $M_{gas}$ has the substantially same value of $M_{act}$ or when $M_{gas} > M_{act}$, the change of $M_{act}+M_{act}$ also becomes great by the change of $M_{gas}$, and $M_{gas}$ may be recognized as not the noise component but a variation of the distance l.

Here, a case where the sensor unit 20 according to the present embodiment is used is compared with a case where a bulk type piezoelectric body is used instead of the sensor unit 20.

When the bulk type piezoelectric body is used, a value of a thickness dimension t of the piezoelectric body is larger than the thickness dimension t of the acoustic transducer Tr according to the present embodiment. Specifically, the thickness dimension t of the acoustic transducer Tr according to the present embodiment is equal to or smaller than 5 μm as described above, whereas the thickness dimension t of the bulk type piezoelectric body is limited to the order of millimeter even though the piezoelectric body is formed as thin as possible. That is, as in the present embodiment, in the acoustic transducer Tr which is a thin type piezoelectric body obtained by stacking the piezoelectric elements 23 on the vibration plate 22, the thickness dimension thereof may be formed to have a thickness of about 1/1000 times lower than that of the bulk type piezoelectric body.

The inertance $M_{act}$ shown in Expression (3) is compared between the bulk type piezoelectric body which is a comparative example and the acoustic transducer Tr according to the present embodiment.

Since the bulk type piezoelectric body of the comparative example has the thickness dimension of about 1000 times higher than that of the acoustic transducer Tr according to the present embodiment, the value of the inertance $M_{act}$ also increases to about 1000 times.

Meanwhile, in comparison of the density $\rho_{film}$ of the vibration plate 22 with the density $\rho_{gas}$ of the gas, the density $\rho_{film}$ of the vibration plate 22 is about 1000 times higher than the density $\rho_{gas}$ of the gas. Thus, when the bulk type piezoelectric body of the comparative example is used, the number of digits (unit) is greatly different between the value of $M_{gas}$ and the value of $M_{act}$, and the relationship of $M_{gas} \ll M_{act}$ is satisfied. In this case, the calculation precision of the distance l is extremely low as stated above.

In contrast, in the present embodiment, since the acoustic transducer Tr has the thickness dimension of about 1/1000 lower than that of the bulk type piezoelectric body, it is possible to redeem the fact that the density $\rho_{film}$ of the vibration plate 22 is about 1000 times higher than the density $\rho_{gas}$ of the gas. That is, the number of digits (unit) is substantially the same between the value of $M_{gas}$ and the value of $M_{act}$, and thus, it is possible to calculate the distance l with high precision without recognizing $M_{gas}$ as noise.

Figure 3:
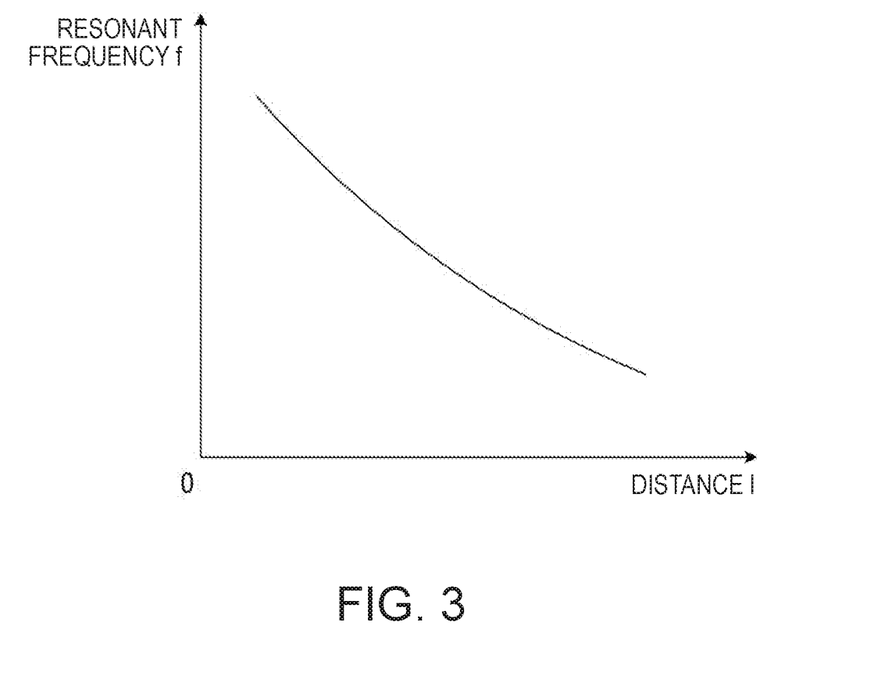
FIG. 3 is a diagram showing a relationship between a resonant frequency and a liquid surface position (distance).

FIG. 3 is a diagram showing the relationship between the resonant frequency and the position (distance l) of the liquid surface 52.

As described above, in the present embodiment, the compliance $C_{gas}$ is sufficiently smaller than the compliance $C_{act}$ of the sensor unit 20 in Expression (1), and thus, it is possible to ignore $C_{gas}$. Since the inertance $M_{act}$ and the inertance $M_{gas}$ are equivalent to each other, the calculation precision of the distance l increases. In the present embodiment, when the relationship between the distance l and the resonant frequency f is shown, one distance l and one resonant frequency f are associated with each other as shown in FIG. 3. The resonant frequency increases when the liquid surface 52 increases (the distance l decreases), and the resonant frequency decreases when the liquid surface 52 decreases (the distance l increases).

Accordingly, it is possible to obtain the distance l from the sensor unit 20 to the liquid surface 52 by detecting the resonant frequency f.

Liquid Surface Detection Method

Next, a liquid surface detection method using the liquid surface sensor 1 will be described.

Figure 4:
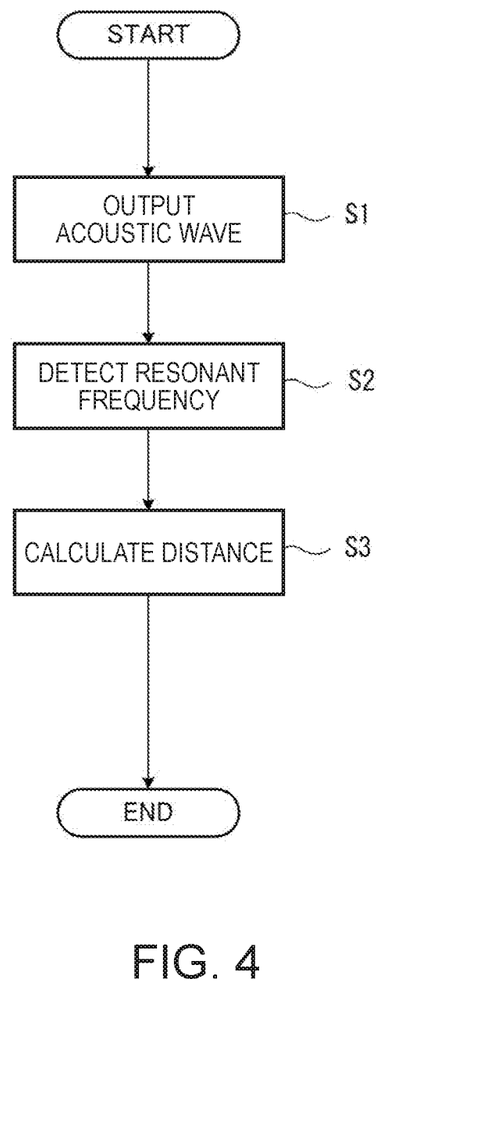
FIG. 4 is a flowchart showing a liquid surface detection method using the liquid surface sensor according to the first embodiment.

FIG. 4 is a flowchart showing the liquid surface detection method using the liquid surface sensor 1.

As stated above, the liquid surface sensor 1 is attached to a predetermined position of the tank 50 that stores the liquid 51, and the second opening end 12 of the hollow member 10 is disposed so as to be inserted into the liquid 51 from the liquid surface 52. Since the gas connection hole is formed near the first opening end 11 of the hollow member 10, the liquid 51 within the tank 50 penetrates into the hollow member 10 from the second opening end 12 of the hollow member 10, and the position of the liquid surface 52 of the hollow space 10A is the same as the liquid surface position within the tank 50.

When the position of the liquid surface 52 is detected by the liquid surface sensor 1, the sensor drive control unit 31 of the control unit 30 initially controls the sensor unit 20 to output the acoustic wave to the hollow space 10A (step S1).

In the present embodiment, the acoustic transducers Tr of which the frequencies of the acoustic waves to be output are different are driven in order in step S1. That is, the frequency sweep of the acoustic wave to be output is performed.

The frequency detection unit 32 detects the resonant frequency from the detection signals output from the plurality of acoustic transducers Tr based on the acoustic transducer Tr that outputs the detection signal of which the voltage value is maximum (step S2).

Figure 5:
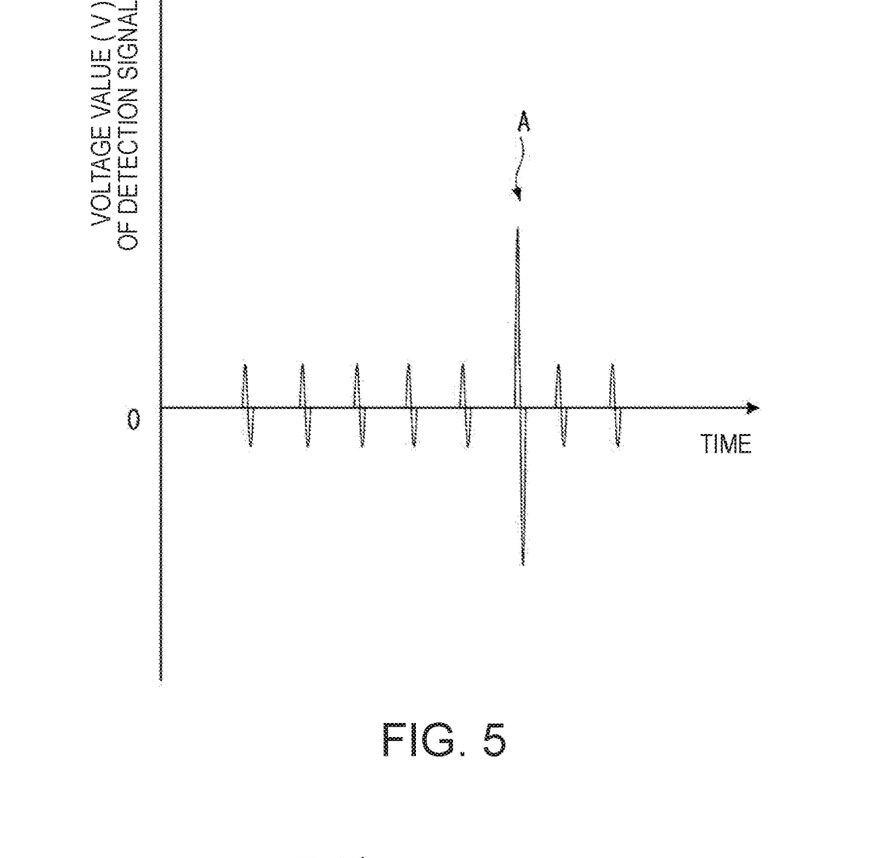
FIG. 5 is a diagram showing a detection method of a resonant frequency according to the first embodiment.

FIG. 5 is a diagram showing a detection method of the resonant frequency according to the present embodiment in which a horizontal axis represents a time and a vertical axis represents a voltage of the detection signal output from the acoustic transducer Tr.

In step S1, the detection signal shown in FIG. 5 is obtained when the frequency sweep of the acoustic wave is performed within the target frequency range and the transmission of the acoustic wave and the detection of the detection signal from the acoustic transducer Tr are alternately performed.

That is, the frequency of the acoustic wave output from the sensor unit 20 varies with time. Here, when the acoustic wave having the frequency matching the natural frequency corresponding to the volume of the hollow space 10A, among the acoustic waves output to the hollow space 10A, is output, the resonance occurs in the hollow space 10A. Accordingly, the vibration plate 22 (vibration portions 22A) of the acoustic transducer Tr resonates, and both the voltage value and the detection signal output from each acoustic transducer Tr increase as represented by A in FIG. 5.

Thus, it is possible to detect the resonant frequency by storing the detection signal from the piezoelectric element 23 after the acoustic wave is output and determining the acoustic transducer Tr that outputs the acoustic wave of which the voltage value of the detection signal is maximum. For example, it is possible to detect the resonant frequency by storing the frequency of the acoustic wave output from each acoustic transducer Tr in the storage unit and reading the frequency corresponding to the acoustic transducer Tr that outputs the acoustic wave from the storage unit when the detection signal is maximum.

Since the acoustic transducer Tr that outputs the acoustic wave having the frequency matching the resonant frequency has the natural frequency equal to the resonant frequency, the vibration amplitude is higher than that of another acoustic transducer Tr due to the resonance. Thus, the resonant frequency may be detected by specifying the acoustic transducer Tr from which the voltage of the detection signal is maximum.

Thereafter, the distance calculation unit 33 calculates the distance l using the detected resonant frequency (step S3). In the calculation of the distance l, the distance l from the sensor unit 20 to the liquid surface 52 may be calculated from Expressions (1) and (4). For example, relationship data between the distance l and the resonant frequency f shown in FIG. 3 may be stored in the storage unit, and the distance l corresponding to the resonant frequency f may be obtained from the relationship data.

Effects of Present Embodiment

In the present embodiment, the liquid surface sensor 1 includes the hollow member 10 having the first opening end 11 and the second opening end 12, and the sensor unit 20 provided so as to close the first opening end 11 of the hollow member 10. The sensor unit 20 includes the vibration plate 22, and the piezoelectric element 23 that is provided on the vibration plate 22 and is formed by laminating the first electrode film 23A, the piezoelectric film 23B, and the second electrode film 23C in the thickness direction of the vibration plate 22.

In such a liquid surface sensor 1, the hollow space 10A is the substantially closed space by disposing the liquid surface sensor 1 with respect to the liquid 51 such that the second opening end 12 of the hollow member 10 enters the liquid 51. The vibration plate 22 resonates in the natural frequency of the gas of the hollow space 10A, and thus, it is possible to detect the resonant frequency. It is possible to calculate the distance from the sensor unit 20 to the liquid surface 52 based on the resonant frequency. Accordingly, a wide space for causing Helmholtz resonance within the tank that stores the liquid 51 is not needed unlike the related art, and it is possible to detect the position of the liquid surface 52 irrespective of the measurement space.

When the bulk type piezoelectric body is used instead of the piezoelectric element 23, since the thickness dimension t increases, the inertance $M_{act}$ has the extremely large value compared to the inertance $M_{gas}$ of the gas of the hollow space 10A. In this case, there is a high possibility that the variation of $M_{gas}$ is recognized as the noise component, and it is not possible to accurately calculate the minute variation of the distance l. In contrast, in the present embodiment, since the sensor unit 20 is constituted by the thin film type piezoelectric element 23, the thickness dimension t is about 1/1000 lower than that of the bulk type piezoelectric body. Accordingly, it is possible to calculate the distance l with sufficient measurement precision.

In the present embodiment, the total film thickness of the vibration plate 22 and the piezoelectric element 23 is equal to or lower than 5 μm. In such a case, it is possible to increase the displacement amount of the vibration plate 22, and the signal to be output from the piezoelectric element 23 also increases. It is possible to sufficiently reduce the inertance $M_{act}$ of the sensor unit 20, and it is possible to detect the position of the liquid surface 52 with high precision.

In the present embodiment, the control unit 30 that calculates the distance l between the sensor unit 20 and the liquid surface 52 of the hollow member 10 is provided. The control unit 30 detects the resonant frequency when the vibration plate 22 resonates, and calculates the distance l based on Expressions (1) and (4) or using the relationship data between the resonant frequency and the distance shown in FIG. 3. Accordingly, it is possible to calculate the distance l with high precision as described above.

In the present embodiment, the control unit 30 calculates the distance l by transmitting the acoustic wave to the inside of the hollow member 10 from the sensor unit 20 and detecting the vibration frequency (resonant frequency) of the vibration plate 22 that vibrates due to the acoustic wave which resonates between the liquid surface 52 and the sensor unit 20.

As stated above, it is possible to efficiently detect the resonant frequency, and it is possible to easily calculate the distance l.

The control unit 30 performs the frequency sweep of the acoustic wave transmitted from the sensor unit 20 within the target frequency range. The frequency of the acoustic wave when the signal to be output from the piezoelectric element 23 is maximum is detected as the resonant frequency. In this case, it is possible to easily specify the resonant frequency within the target frequency range by monitoring the voltage value of the detection signal.

Second Embodiment

Next, a second embodiment will be described.

In the following description, the already described matters will be assigned the same reference numerals, and the description thereof will be omitted or simplified.

It has been described in the aforementioned first embodiment that the multiple kinds of acoustic transducers Tr of which the frequencies of the acoustic waves to be output are different are driven in order, and the frequency of the acoustic transducer Tr driven when the voltage value of the detection signal is maximum or the frequency of the acoustic transducer Tr that outputs the detection signal of which the voltage value is maximum is detected as the resonant frequency. In contrast, the second embodiment is different from the first embodiment in that the sensor drive control unit 31 causes the acoustic transducers Tr to simultaneously output the acoustic waves in step S1.

In this case, the acoustic wave to be output to the hollow space 10A is the acoustic wave including a plurality of frequency components. However, when the same frequency component as that of the natural frequency of the gas of the hollow space 10A is included in this acoustic wave, the resonance occurs similarly to the first embodiment.

In this case, in step S2, the frequency corresponding to the acoustic transducer Tr when the voltage value of the detection signal is maximum is detected as the resonant frequency.

In the present embodiment, the control unit 30 can detect the resonant frequency without performing the frequency sweep of the acoustic wave to be output from the sensor unit 20. Accordingly, it is possible to more quickly detect the position of the liquid surface 52.

Third Embodiment

Next, a third embodiment will be described.

It has been described in the first embodiment and the second embodiment that the multiple kinds of acoustic transducers Tr of which the frequencies of the acoustic waves to be output are different are provided in the sensor unit 20. In contrast, the third embodiment is different from the first and second embodiments in that the acoustic transducers Tr have the same characteristics and the opening dimensions (long-axis length L or short-axis length w) of the openings 21A are the same.

That is, in the first embodiment, the resonant frequency is detected by outputting the acoustic wave of the narrow band using the frequency corresponding to the opening dimension of the opening 21A as its center. In this case, each acoustic transducer Tr is designed such that halfwidth is equal to or smaller than a predetermined first threshold in the frequency of the acoustic wave to be output. In contrast, in the third embodiment, the acoustic transducer Tr is designed such that the halfwidth is larger than the first threshold and the target frequency range is included in the range of the halfwidth. In this case, in step S1, when the acoustic transducer Tr is driven, the same acoustic wave in the case where the acoustic transducers Tr of the narrow band are simultaneously driven, that is, the acoustic wave having a broad frequency waveform over each frequency of the target frequency range is output.

Figure 6:
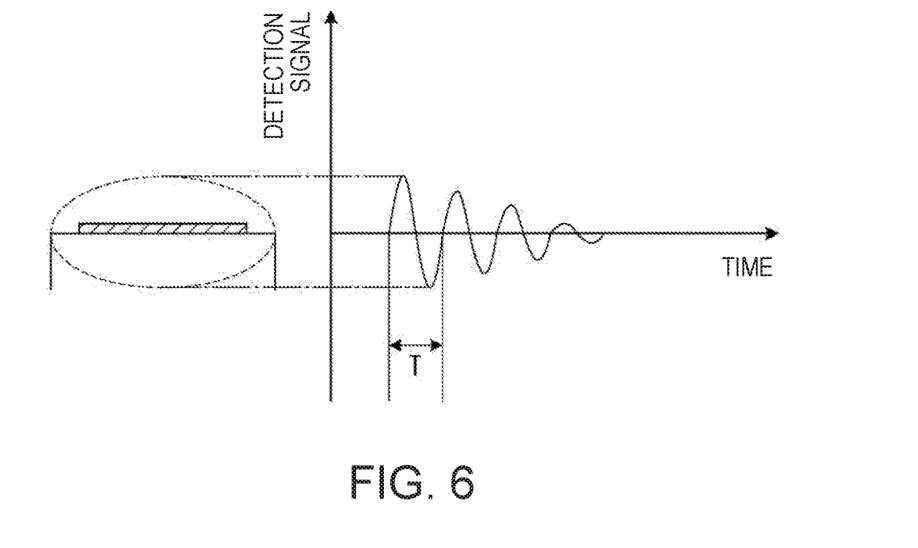
FIG. 6 is a diagram showing a detection method of a resonant frequency according to a second embodiment.

FIG. 6 is a diagram showing a detection method of a resonant frequency according to the present embodiment.

In the present embodiment, it is not possible to detect the resonant frequency by specifying the acoustic transducer Tr that outputs the acoustic wave having the same frequency as the resonant frequency or the acoustic transducer Tr when the voltage value is maximum, similarly to the first embodiment.

Accordingly, in the present embodiment, the resonant frequency is detected based on the waveform of the detection signal to be output from the acoustic transducer Tr in step S2.

That is, as shown in FIG. 6, when the vibration portion 22A resonates, the signal corresponding to the displacement position of the vibration portion 22A is output, and the signal waveform is formed. Thus, a vibration cycle T of the vibration portion 22A matches a cycle T of the detection signal, and thus, it is possible to detect the resonant frequency from the cycle T.

Accordingly, in the present embodiment, it is possible to detect the resonant frequency even though the acoustic transducers Tr corresponding to the multiple kinds of frequencies are not provided, unlike the first embodiment or the second embodiment.

Fourth Embodiment

Next, a fourth embodiment will be described.

The acoustic wave is output by driving the acoustic transducer Tr and the resonant frequency is detected in the first embodiment to the third embodiment, whereas the acoustic wave is not output from the sensor unit 20 in step S1 in the fourth embodiment.

In the present embodiment, one kind of acoustic transducer Tr is provided in the sensor unit 20 similarly to the third embodiment. The one kind of acoustic transducer Tr may be provided in plural or only one acoustic transducer Tr may be provided.

In the present embodiment, an acoustic wave having a predetermined frequency is not output. Thus, the vibration plate 22 may be formed so as to cover the first opening end 11, and the piezoelectric element 23 may be provided on the vibration plate 22. That is, the element substrate 21 having the opening 21A may not be provided.

Figure 7:
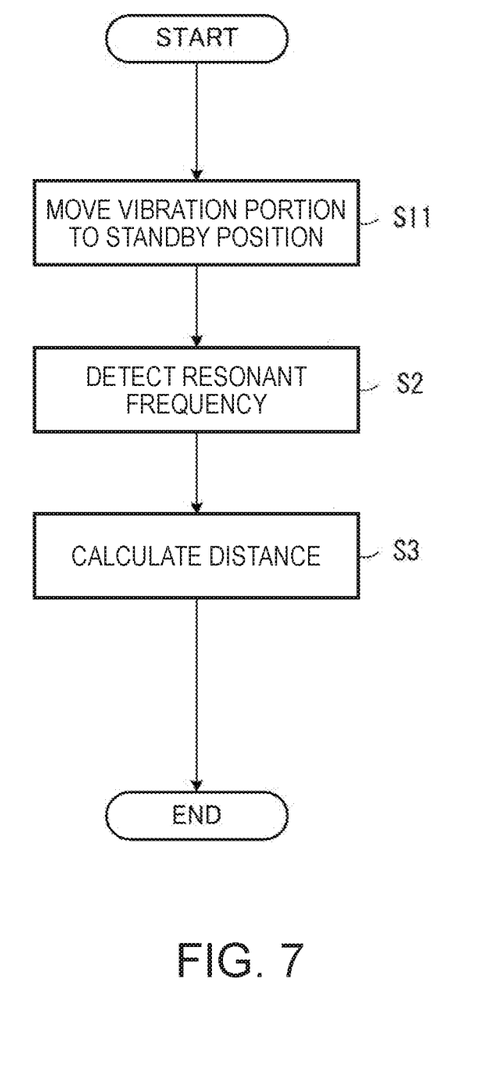
FIG. 7 is a flowchart showing a liquid surface detection method using a liquid surface sensor according to a fourth embodiment.

FIG. 7 is a flowchart showing a distance calculation method according to the present embodiment.

In the present embodiment, instead of step S1 of FIG. 5, the sensor drive control unit 31 moves the vibration portion 22A of the acoustic transducer Tr to a standby position displaced in one direction by a predetermined amount (step S11).

For example, in step S11, the sensor drive control unit 31 applies a predetermined voltage value to the acoustic transducer Tr. Accordingly, the piezoelectric film 23B is deformed in a shape corresponding to an application voltage. The shape (position) of the vibration portion 22A is also changed depending on stress corresponding to the deformation, and the vibration portion is moved to the standby position. The vibration portion 22A is not also moved from the standby position by continuing to apply the voltage to the piezoelectric film 23B.

Although it has been described above that the predetermined voltage is applied by the sensor drive control unit 31, the present embodiment is not limited thereto. For example, predetermined stress may continue to be applied to the vibration portion by pushing or pulling the vibration portion 22A using an elastic member such as a spring, and thus, the vibration portion 22A may be moved to the standby position. The sensor unit 20 includes a casing that forms a closed space on a side opposite to the hollow space 10A of the vibration plate 22, and may move the vibration portion 22A to the standby position by increasing or decreasing an internal pressure within the casing.

In the present embodiment, in step S2, the vibration plate 22 is opened by canceling the stress that holds the vibration portion in the standby position, and is in a free state. Accordingly, the vibration plate 22 (vibration portion 22A) performs damped vibration due to restoration force for returning to the original position from the standby position. At this time, the vibration plate 22 (vibration portion 22A) vibrates in the same frequency as the natural frequency determined by the inertia of the gas of the hollow space 10A and the rigidity of the vibration plate 22.

Thus, similarly to the third embodiment, it is possible to detect the resonant frequency from the signal waveform of the detection signal to be output from the vibration plate 22 (vibration portion 22A).

In the present embodiment, the control unit 30 moves the vibration plate 22 to the standby position by displacing the vibration plate in the thickness direction due to the application of the stress to the vibration plate, and detects the resonant frequency from the vibration of the vibration plate when the stress exerted to the vibration plate is canceled from the standby position.

In this case, since the resonant frequency is calculated based on damped free vibration of the vibration plate 22, it is not necessary to output the acoustic wave from the sensor unit 20. Since the vibration plate 22 does not vibrate due to residual vibration at the time of outputting the acoustic wave, it is possible to efficiently perform the processing in the liquid surface detection.

Fifth Embodiment

Next, a fifth embodiment will be described.

It has been in the first to fourth embodiments that the distance calculation unit 33 detects the resonant frequency, and calculates the distance l based on Expression (1) or (3) or based on the relationship data between the resonant frequency and the distance shown in FIG. 3. In contrast, in the fifth embodiment, the distance l is calculated by both the distance calculation based on the resonant frequency and the distance calculation using a Time of flight (TOF) method.

That is, the method shown in the first to fourth embodiment is a method capable of precisely calculating the distance l even when the liquid surface 52 within the tank 50 is wavy in a case where there is vibration in the tank 50. Meanwhile, in the TOF method, when there is vibration in the tank 50, the acoustic wave is reflected from the liquid surface 52 in various directions, and the precision of the distance measurement deteriorates. Thus, when the liquid surface 52 is wavy, it is preferable that the calculation of the distance l based on the resonant frequency is performed.

In contrast, when there is no vibration in the tank 50 and the liquid surface 52 is not wavy, it is possible to quickly perform the distance calculation with high precision by using the TOF method of calculating the distance l based on a time from a transmission timing of the acoustic wave to a reception timing thereof and a speed of sound in the gas.

When the distance l is calculated based on the resonant frequency, since there are many parameters to be used as represented by Expression (1) and the distance l is calculated by an approximate expression in which the compliance $C_{gas}$ is ignored, the precision thereof deteriorates compared to the distance calculation using the TOF method.

In contrast, in the present embodiment, distance calculation using both the distance calculation based on the resonant frequency and the distance calculation using the TOF method is performed. That is, in the present embodiment, the distance calculation based on the resonant frequency is performed when there is vibration in the tank 50, and both the distance calculation using the TOF method and the distance calculation based on the resonant frequency are performed when there is no vibration in the tank 50. Accordingly, it is possible to perform the liquid surface detection with higher precision.

An application example of the liquid surface sensor 1 according to the present embodiment will be described as a specific example.

Figure 8:
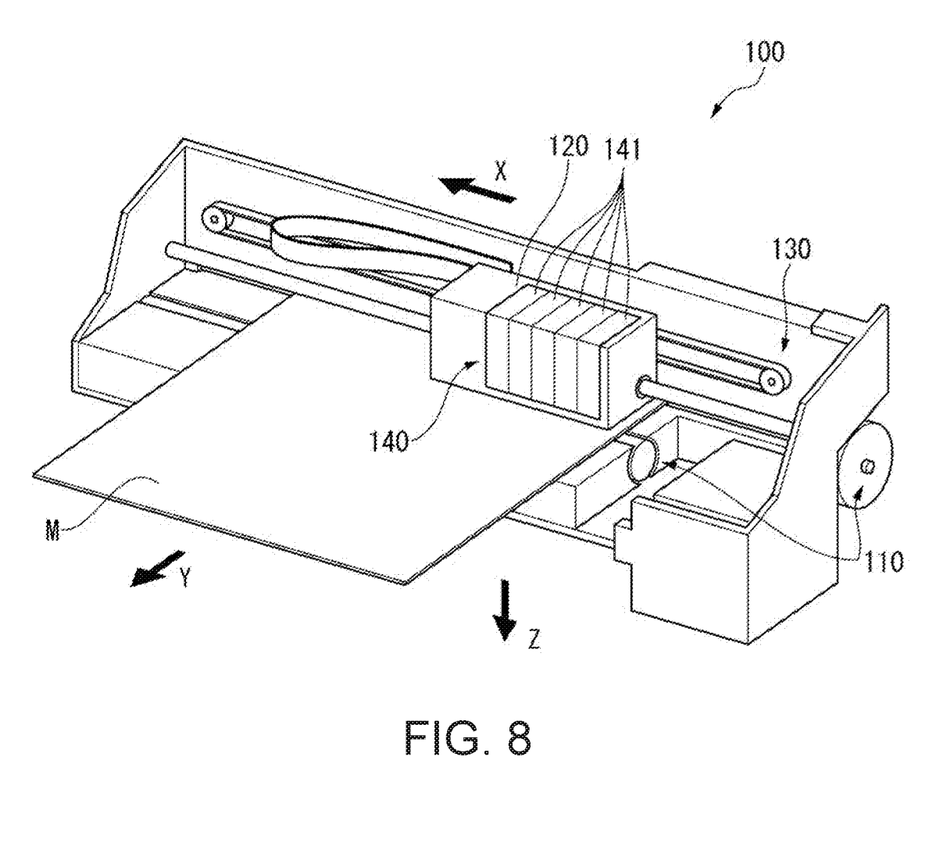
FIG. 8 is a schematic diagram of a printer including an ink tank having a liquid surface sensor according to a fifth embodiment.

FIG. 8 is a schematic diagram of a printer 100 including an ink tank in which the liquid surface sensor 1 is provided.

The printer 100 shown in FIG. 8 includes a transport mechanism 110, a carriage 120, and a carriage drive unit 130 that moves the carriage 120.

For example, the transport mechanism 110 transports a medium M such as paper to a predetermined printing position in a Y direction.

The carriage 120 is provided so as to be movable in an X direction perpendicular to the Y direction.

For example, the carriage drive unit 130 moves the carriage 120 in the X direction by driving a timing belt.

A printing unit 140 is provided at the carriage 120. The printing unit 140 includes an ink tank 141, and forms an image by ejecting ink supplied from the ink tank 141 on the medium M. Although not shown, a supply mechanism of the ink is connected to the ink tank 141, and the ink tank is maintained such that the ink stored in the ink tank 141 is constant (the position of the liquid surface 52 within the ink tank 141 is constant).

In such a printer 100, it is necessary to constantly or regularly check the remaining amount of the ink such that the ink stored in the ink tank 141 is maintained in a predetermined amount. Thus, the liquid surface sensor 1 described in the first embodiment to the fourth embodiment is provided in the ink tank 141, and the liquid surface position of the ink is detected.

Here, when the carriage 120 is driven, power from the carriage drive unit 130 is transmitted, and thus, vibration occurs in the ink tank 141.

In this case, as described in the first to fourth embodiments, the control unit 30 detects the resonant frequency of the vibration plate 22 (vibration portion 22A), and detects the position of the liquid surface 52 (calculates the distance l) from the resonant frequency.

Meanwhile, when the carriage 120 is on standby at, for example, an end (home position) in the X direction, the power from the carriage drive unit 130 is not transmitted, and the liquid surface 52 is at rest.

In this case, the control unit 30 calculates the distance by the TOF method by outputting the acoustic wave from the sensor unit 20 and receiving the acoustic wave reflected from the liquid surface 52.

At this time, it is preferable that the control unit 30 performs the calculation of the distance l using the resonant frequency in addition to the distance calculation using the TOF method.

In this case, the control unit 30 may compare a distance l' obtained by the TOF method with the distance l calculated using the resonant frequency, and may perform correction when these distances are different from each other.

Specifically, in the TOF method, the distance l' from the liquid surface 52 to the vibration plate 22 is calculated with a stop position in which the vibration plate 22 stops as its reference. Meanwhile, in the distance calculation based on the resonant frequency, an average position when the vibration plate 22 vibrates is used as a reference position, and the distance l from the reference position to the liquid surface 52 is calculated. For example, the reference position is measured in advance at the time of manufacturing the liquid surface sensor 1, and is stored in the storage unit.

As stated above, there is a difference between the distance l' obtained by the TOF method and the distance l calculated based on the resonant frequency by a dimension between the reference position and the stop position. However, the average position (reference position) when the vibration plate 22 vibrates varies due to degradation over time in the liquid surface sensor 1 in some cases.

Thus, in the present embodiment, when the carriage 120 is positioned in the home position, both the distance calculation using the TOF method and the distance calculation based on the resonant frequency are performed. Accordingly, it is possible to determine a variation in difference between the reference position and the stop position. When the difference varies, a variation value is stored as a correction value in the storage unit. Accordingly, when the distance calculation is performed based on the resonant frequency, the correction value is added to the calculated distance l, and thus, it is possible to correct an error due to the degradation over time in the liquid surface sensor 1.

In the present embodiment, when the distance l based on the resonant frequency is calculated while the carriage 120 is moving, it is possible to correct the calculated value using the correction value, and it is possible to perform the liquid surface detection with higher precision.

Modification Example

The invention is not limited to the aforementioned embodiments and the modification example, and modifications and improvements in a range in which the object of the invention can be achieved, and configurations obtained by appropriately combining the embodiments are included in the invention.

Although it has been described in the first embodiment that the hollow member 10 of the liquid surface sensor 1 has a tubular shape which has a linear axial direction, the first embodiment is not limited thereto.

Figure 9:
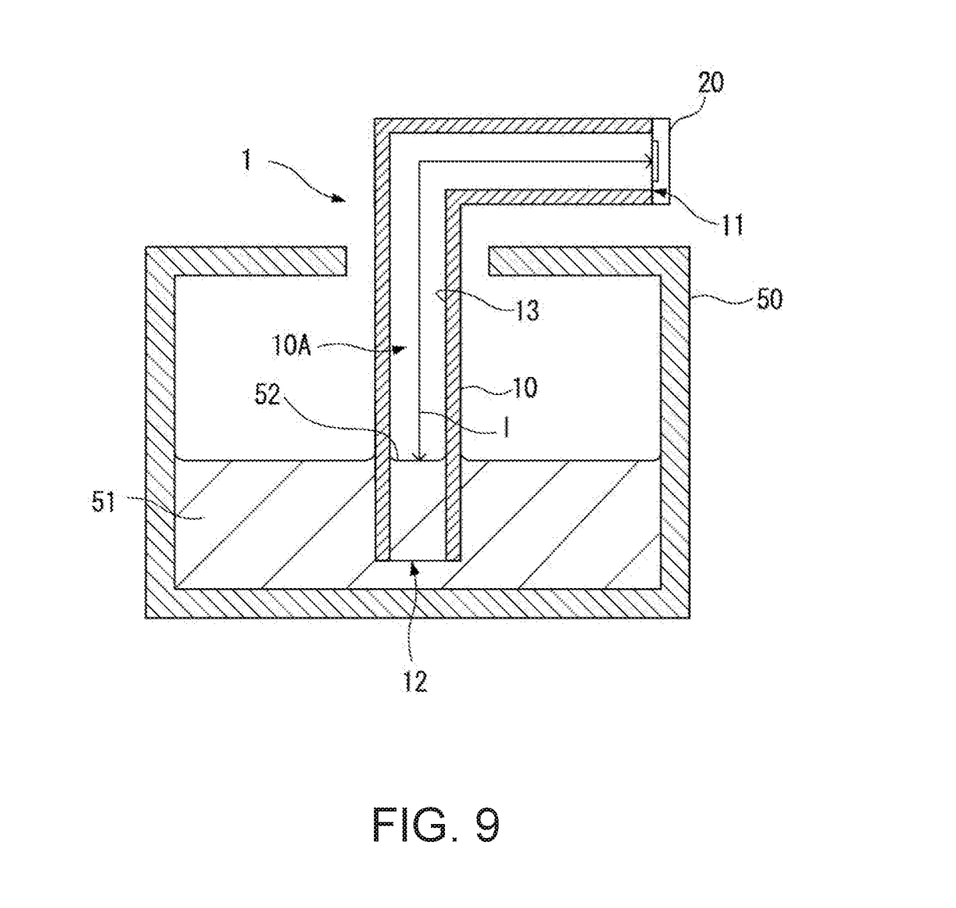
FIG. 9 is a schematic diagram showing an outline of a liquid surface sensor according to a modification example.

FIG. 9 is a diagram showing another example of the liquid surface sensor 1.

The hollow member 10 may have a shape shown in FIG. 9 formed so as to be bent between the first opening end 11 and the second opening end 12. The hollow member may have a shape so as to be curved in an arc between the first opening end 11 and the second opening end 12. In this case, the distance calculation using the TOF method shown in the fifth embodiment is not able to be performed, but it is possible to provide the liquid surface sensor 1 in an intended position. Thus, a degree of freedom of provision and a degree of freedom of shape are improved. For example, the hollow member 10 may be constituted by a rigid body or may be constituted by a flexible member such as a resin member. When the hollow member is constituted by the flexible member, it is possible to modify the provision position or shape of the liquid surface sensor 1 depending on the shape of the tank 50, and thus, the general-purpose properties of the hollow member are improved.

Although it has been described that the hollow member 10 is inserted into the liquid surface 52 in a vertical direction, the invention is not limited to thereto. The insertion direction of the hollow member into the liquid surface 52 may be any direction. The liquid surface 52 may be formed within the hollow member 10, and the hollow space 10A as the closed space may be formed.

That is, since the liquid surface sensor 1 calculates the distance based on the resonant frequency that varies depending on the volume of the hollow space 10A, it is possible to freely change the shape or insertion direction of the hollow member 10 into the liquid 51 and the direction of the liquid surface 52 in the hollow space 10A.

Although it has been described in the first embodiment that each acoustic transducer Tr is designed such that the wavelength λ of the acoustic wave to be output from the acoustic transducer Tr is longer than the distance (x1, x2) as the measuring target and the distance l is obtained in Expression (1) using the approximate expression in which $C_{gas}$ is ignored, the invention is not limited thereto.

For example, the relationship of λ≤l may be satisfied. In this case, since $C_{gas}$ includes the parameter of the distance l, the number of terms including l increases in Expression (1), and a load related to the calculation increases. However, similarly to the first embodiment, since the thickness dimension t of the piezoelectric element 23 is sufficiently smaller than that of the bulk type piezoelectric body, the inertance $M_{act}$ of the sensor unit 20 can be equal to or smaller than the inertance $M_{gas}$ of the gas of the hollow space 10A, and thus, it is possible to precisely calculate the distance l.

Although it has been described in the first embodiment that the frequency sweep is performed by providing the multiple kinds of acoustic transducers Tr of which the frequencies of the acoustic waves to be output are different and switching between the acoustic transducers Tr that output the acoustic waves in order, the invention is not limited thereto.

For example, even though one kind of acoustic transducer is used, it is possible to output the acoustic wave having a desired frequency by controlling the waveform of the drive signal to be input to the acoustic transducer Tr using, for example, a function generator, and it is possible to perform the frequency sweep.

The specific structure at the time of implementing the invention may be constituted by appropriately combining the aforementioned embodiments and the modification example within the range in which the object of the invention can be achieved, or may be appropriately changed to another structure.

The entire disclosure of Japanese Patent Application No. 2017-230037 filed Nov. 30, 2017 is expressly incorporated herein by reference.

What is claimed is:

1. A printer comprising:
an ink tank configured to store an ink therein, the ink being supplied from outside of the ink tank into the tank;
a carriage having a printing member, the ink tank being provided on the carriage, the printing member being configured to eject the ink onto a medium;
a carriage drive mechanism configured to move the carriage;
an ink surface detector, the ink surface detector being provided inside the ink tank, the ink surface detector being configured with:
 a hollow member that has a first opening end and a second opening end opposite to each other, at least the second opening end being immersed in the ink; and
 a piezoelectric sensor that is provided so as to close the first opening end of the hollow member, wherein the piezoelectric sensor includes a vibration plate, and a piezoelectric element that is provided on the vibration plate, and the piezoelectric element is formed by laminating a first electrode film, a piezoelectric film, and a second electrode film in order in a thickness direction of the vibration plate; and
a controller, the controller being configured to:
 cause the piezoelectric sensor to vibrate the vibration plate and detect a resonant frequency;
 cause the piezoelectric sensor to propagate an acoustic wave toward the ink and receive a reflected acoustic wave that is generated by reflecting the acoustic wave of the ink;
 calculate a first position of an ink surface of the ink in the ink tank in response to the resonate frequency;
 calculate a second positon of the ink surface in response to the acoustic wave and the reflected acoustic wave; and
 determine a corrected position of the ink surface based on the first and second positons,
wherein the controller is configured to adjust a positon of the ink surface to a predetermined positon in response to the corrected positon by adjusting an ink supply amount of the ink that is supplied into the ink tank.

2. The printer according to claim 1,
wherein a total film thickness of the vibration plate and the piezoelectric element is equal to or lower than 5 μm.

3. A liquid surface detection method for a printer, the printer being configured with;
- an ink tank configured to store an ink therein, the ink being supplied from Outside of the ink into the ink tank;
- a carriage having a printing member, the ink tank being provided on the carriage, the printing member being configured to eject the ink onto a medium;
- a carriage drive mechanism configured to move the carriage; and
- an ink surface detector, the ink surface detector being provided inside the ink tank, the ink surface detector being configured with:
  - a hollow member that has a first opening end and a second opening end opposite to each other, at least the second opening end being immersed in the ink; and
  - a piezoelectric sensor that is provided so as to close the first opening end of the hollow member, wherein the piezoelectric sensor includes a vibration plate, and a piezoelectric element that is provided on the vibration plate, and the piezoelectric element is formed by laminating a first electrode film, a piezoelectric film, and a second electrode film in order in a thickness direction of the vibration plate, the method for causing a controller to execute a process, the method comprising executing on the controlling the steps of:

cause the piezoelectric sensor to vibrate the vibration plate and detect a resonant frequency;

cause the piezoelectric sensor to propagate an acoustic wave toward the ink and receive a reflected acoustic wave that is generated by reflecting the acoustic wave of the ink;

calculate a first position of an ink surface of the ink in the ink tank in response to the resonate frequency;

calculate a second positon of the ink surface in response to the acoustic wave and the reflected acoustic wave;

determine a corrected position of the ink surface based on the first and second positons; and adjusting a position of the ink surface to a predetermined position in response to the corrected positon by adjusting an ink supply amount of the ink that is supplied into the ink tank.

* * * * *